United States Patent
Kelso et al.

(10) Patent No.: US 10,345,927 B2
(45) Date of Patent: Jul. 9, 2019

(54) PEN/STYLUS OFFSET MODIFICATION

(71) Applicant: Lenovo (Singapore) Pte. Ltd., Singapore (SG)

(72) Inventors: Scott Edwards Kelso, Cary, NC (US); Xin Feng, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 348 days.

(21) Appl. No.: 14/301,854

(22) Filed: Jun. 11, 2014

(65) Prior Publication Data

US 2015/0363011 A1  Dec. 17, 2015

(51) Int. Cl.
*G06F 3/041* (2006.01)
*G06F 3/0354* (2013.01)

(52) U.S. Cl.
CPC ................................ *G06F 3/03545* (2013.01)

(58) Field of Classification Search
CPC .................................................. G06F 3/03545
See application file for complete search history.

(56) References Cited

U.S. PATENT DOCUMENTS

| 6,728,443 B2 | 4/2004 | Chowdhury et al. | |
| 8,660,978 B2 * | 2/2014 | Hinckley | G06F 3/038 706/52 |
| 2003/0067451 A1 * | 4/2003 | Tagg | G01V 3/088 345/174 |
| 2003/0080946 A1 * | 5/2003 | Chuang | G06F 3/0488 345/173 |
| 2006/0109252 A1 * | 5/2006 | Kolmykov-Zotov | G06F 3/03545 345/173 |
| 2006/0244735 A1 * | 11/2006 | Wilson | G06F 3/0488 345/173 |
| 2014/0022193 A1 * | 1/2014 | Kim | G06F 3/0488 345/173 |
| 2014/0104194 A1 * | 4/2014 | Davidson | G06F 3/0418 345/173 |
| 2014/0306907 A1 * | 10/2014 | Hoshino | G06F 3/0304 345/173 |
| 2014/0354589 A1 * | 12/2014 | Ahn | G06F 3/044 345/174 |

* cited by examiner

*Primary Examiner* — Jonathan A Boyd
(74) *Attorney, Agent, or Firm* — Ference & Associates, LLC

(57) ABSTRACT

An embodiment provides a method, including detecting, using a processor, pen input to a surface of an electronic device; accessing, using a processor, one or more other inputs associated in time with the pen input; and adjusting, using a processor, a location of a display output representing the pen input using both of the detected pen input and the one or more other inputs. Other aspects are described and claimed.

20 Claims, 5 Drawing Sheets

PEN/STYLUS OFFSET MODIFICATION

BACKGROUND

Devices, e.g., tablets, smart phones, laptops having a touch screen, etc., are increasingly being used in connection with a pen or stylus (hereinafter these terms are used interchangeably) as an input modality. Certain inputs are possible using a completely passive pen, i.e., where the pen itself is not actively transmitting information but simply serves as an implement to provide contact with a screen—similar to a finger input. Other pens are semi-passive in that they transmit data, e.g., location data, but in a reactive manner, e.g., in response to a transmission. Still other pens are so-called "smart pens" that actively transmit input data, e.g., location data, other input data (e.g., button press data, pen status data, etc.) from the smart pen to the device.

No matter the type of pen, a visual display output is provided in response to the pen input. For example, in a handwriting application, the handwriting display output is provided in response to the pen input of handwriting. In this way, a user may visualize what he or she has done with the pen, in this case, providing handwriting.

When writing with an electronic pen on a device that has the display output and the pen input surface co-located (e.g., layered one on top the other), such as commonly found in a tablet computing device or the like, inevitably there is some visible offset between where the pen contacts the writing surface and where the "ink" point (i.e., the display output) appears on the display, e.g., underneath the glass. Most often, the tablet is sitting flat on a table in front of the user, and the user is seeing the display from an angle. In this configuration, the thickness of the cover glass creates parallax. Positioning errors from the pen sensing system contribute further, altogether breaking the illusion that writing digitally is anything like writing with a pen on paper.

BRIEF SUMMARY

In summary, one aspect provides a method, comprising: detecting, using a processor, pen input to a surface of an electronic device; accessing, using a processor, one or more other inputs associated in time with the pen input; and adjusting, using a processor, a location of a display output representing the pen input using both of the detected pen input and the one or more other inputs.

Another aspect provides a device, comprising: a surface accepting pen input; a display; a processor operatively coupled to the surface and the display; and a memory storing instructions that are executable by the processor to: detect pen input to the surface; access one or more other inputs associated in time with the pen input; and adjust a location of a display output representing the pen input using both of the detected pen input and the one or more other inputs.

A further aspect provides a computer program product, comprising: a computer readable storage device storing code that is executable by a processor of an electronic device, the code comprising: code that detects pen input to a surface of an electronic device; code that accesses one or more other inputs associated in time with the pen input; and code that adjusts a location of a display output representing the pen input using both of the detected pen input and the one or more other inputs.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
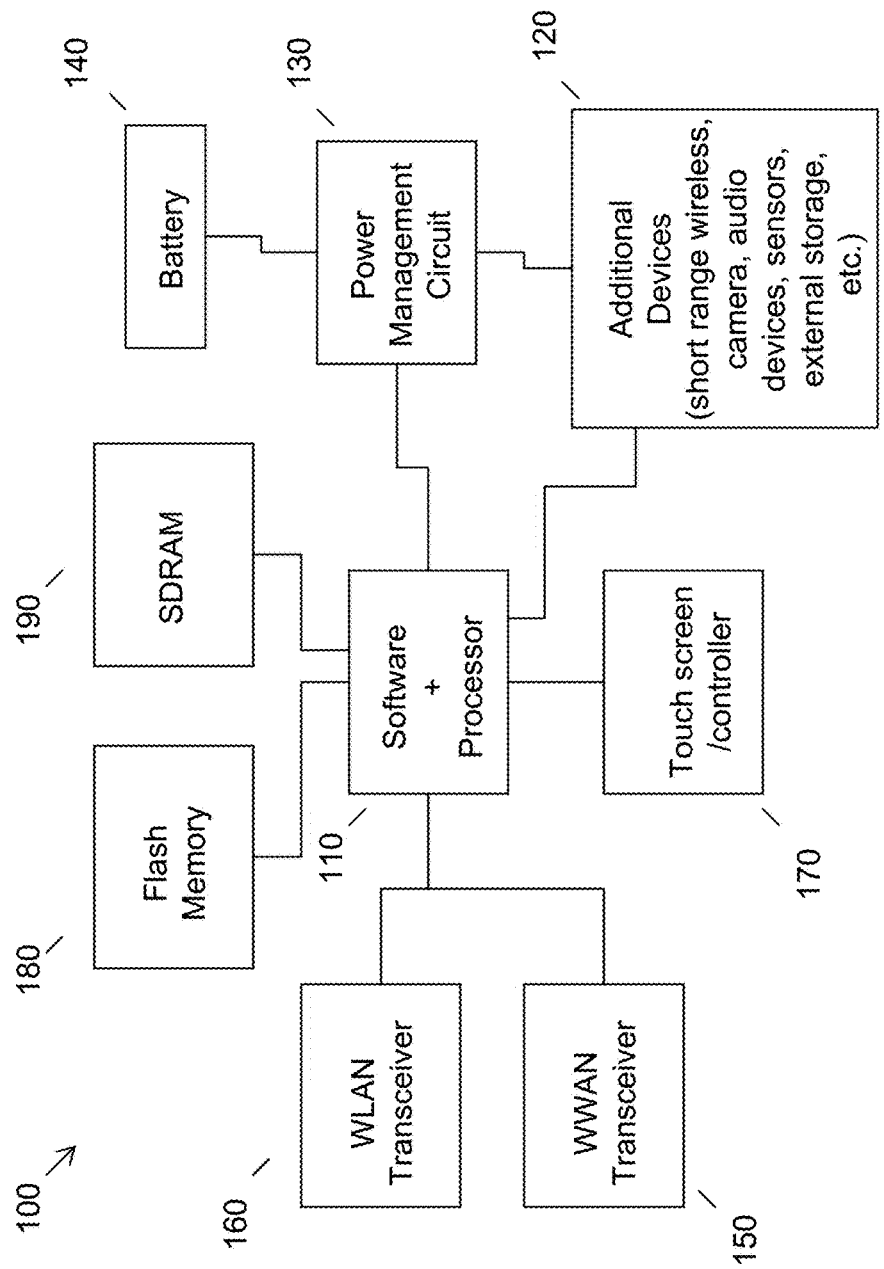
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

To mitigate the visual offset inherent in the display output, conventional devices often build-in a fixed offset between the sensed pen position at the surface and the point of display output (i.e., the drawn position in the example case of handwriting). The position of the user is assumed to be static and the fixed offset is chosen in an attempt to ensure that the drawn position is not obscured by the pen. Because right and left-handed users typically hold the pen in different orientations, users are required to tell the tablet their handedness and writing style so the tablet chooses the correct directionality of the offset.

This conventional approach might be appropriate so long as the user never changes the writing position relative to the tablet. If they do change position, e.g., by rotating the device, etc., the fixed offset changes from being a help to a big hindrance. For example, when the user turns a tablet half-way around, the drawn position is completely hidden behind the pen.

Accordingly, an embodiment provides for more appropriate pen/stylus offset. In an embodiment, a multi-touch subsystem is capable of distinguishing when and where the user's hand has been placed on the writing surface and is also capable of differentiating a finger or hand touch from the tip of the pen. To calculate an offset that is likely to keep the drawn point visible, an embodiment calculates a vector from the centroid of the user's hand/palm contact to the pen contact point. Offset of the display output for the pen writing point is then set to a predetermined distance, e.g., about a few millimeters, further along this vector in the direction away from the user's hand.

According to an embodiment, if hand detection is unreliable, too computationally expensive in a given situation, or otherwise not desirable, an embodiment may make an approximation of the same effect by calculating a display offset using sensor inputs, e.g., using a device's geomagnetic sensor. For example, assuming that the tablet's orientation is "straight" or normal to the user when a writing application is started or the device is awakened from sleep mode, as per convention, an embodiment may apply a fixed offset based on the right or left-handed setting the user has made. If an embodiment then detects that the tablet has been rotated, e.g., using the geomagnetic sensor/compass or like input(s), an embodiment may automatically adjust the direction of the offset to remain constant relative to the user's position, rather than the tablet display's frame of reference.

The illustrated example embodiments will be best understood by reference to the figures. The following description is intended only by way of example, and simply illustrates certain example embodiments.

While various other circuits, circuitry or components may be utilized in information handling devices, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., sensor(s) that may be used to determine device orientation. Commonly, system 100 will include a touch screen/controller 170 for data input and display, e.g., via a stylus or pen as described herein, which may itself include a digitizer or like pen input component or component(s), whether or not co-located with (e.g., overlaying) a display screen. System 100 also typically includes various memory devices, for example flash memory 180 and SDRAM 190.

Figure 2:
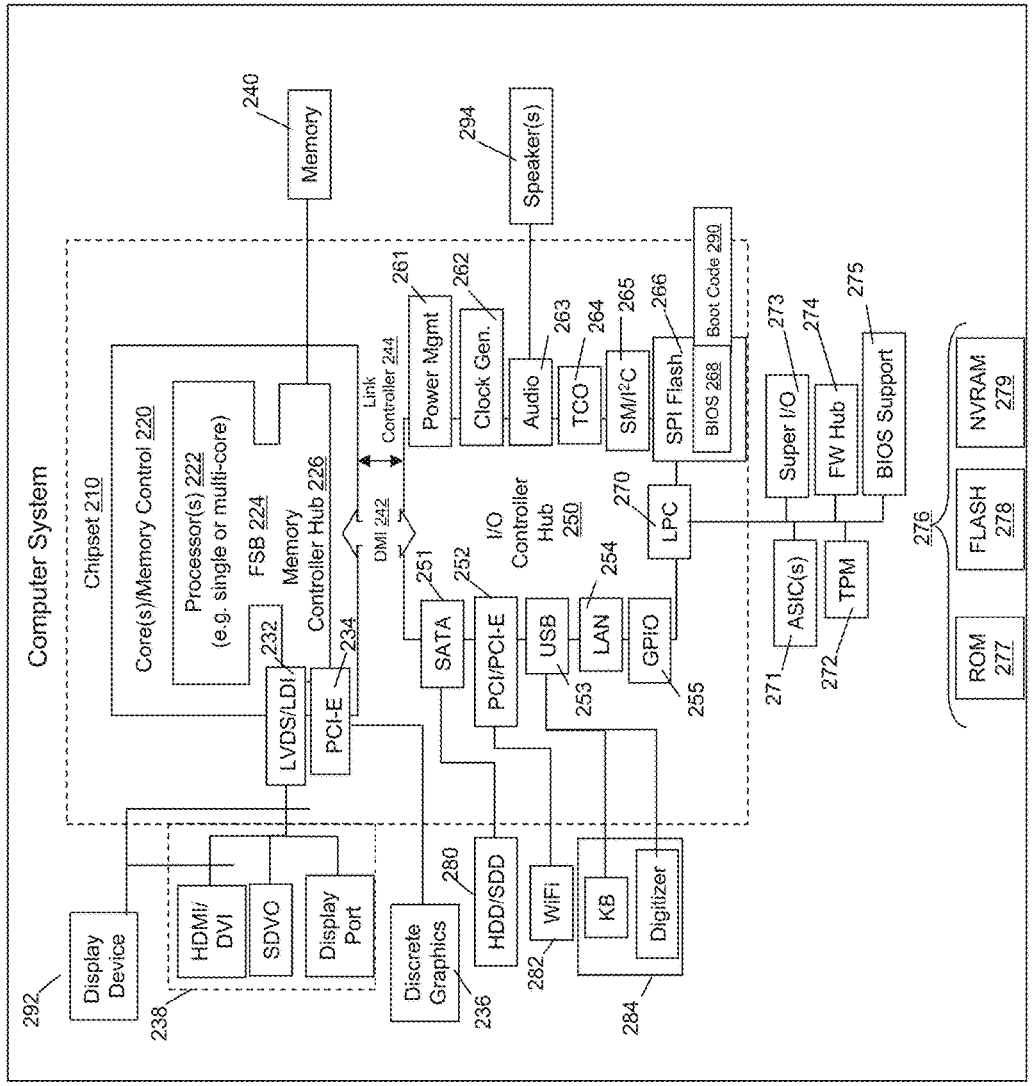
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits, or chips, that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, etc.) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer that accepts pen data inputs, which may be included in a display device 292 in the form of a touch screen display device, a keyboard, a mouse, cameras, phones, microphones, sensors, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261 may manage power output and charging, e.g., as supplied via one or more battery cells, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 and/or FIG. 2, may be used in devices that operate to accept pen input and display output responsive thereto. For example, a tablet or smart phone may include circuitry such as that outlined in FIG. 1. Also, a laptop computer or hybrid device may include circuitry such as that outlined in FIG. 2. Each such device may run applications and/or operating systems that accept pen handwriting input, e.g., for conversion to machine text, for drawing applications, etc.

In the non-limiting example context of handwriting input to a handwriting application, the application will display output that is offset from the point of actual pen contact with the surface, e.g., touch screen display. In an embodiment, and referring to FIG. 3, the offset may be automatically adjusted based on input(s) indicating the needed offset for a given context. This may be particularly helpful for use cases in which a user switches hands during writing and/or rotates or somehow reorients the device.

Figure 3:
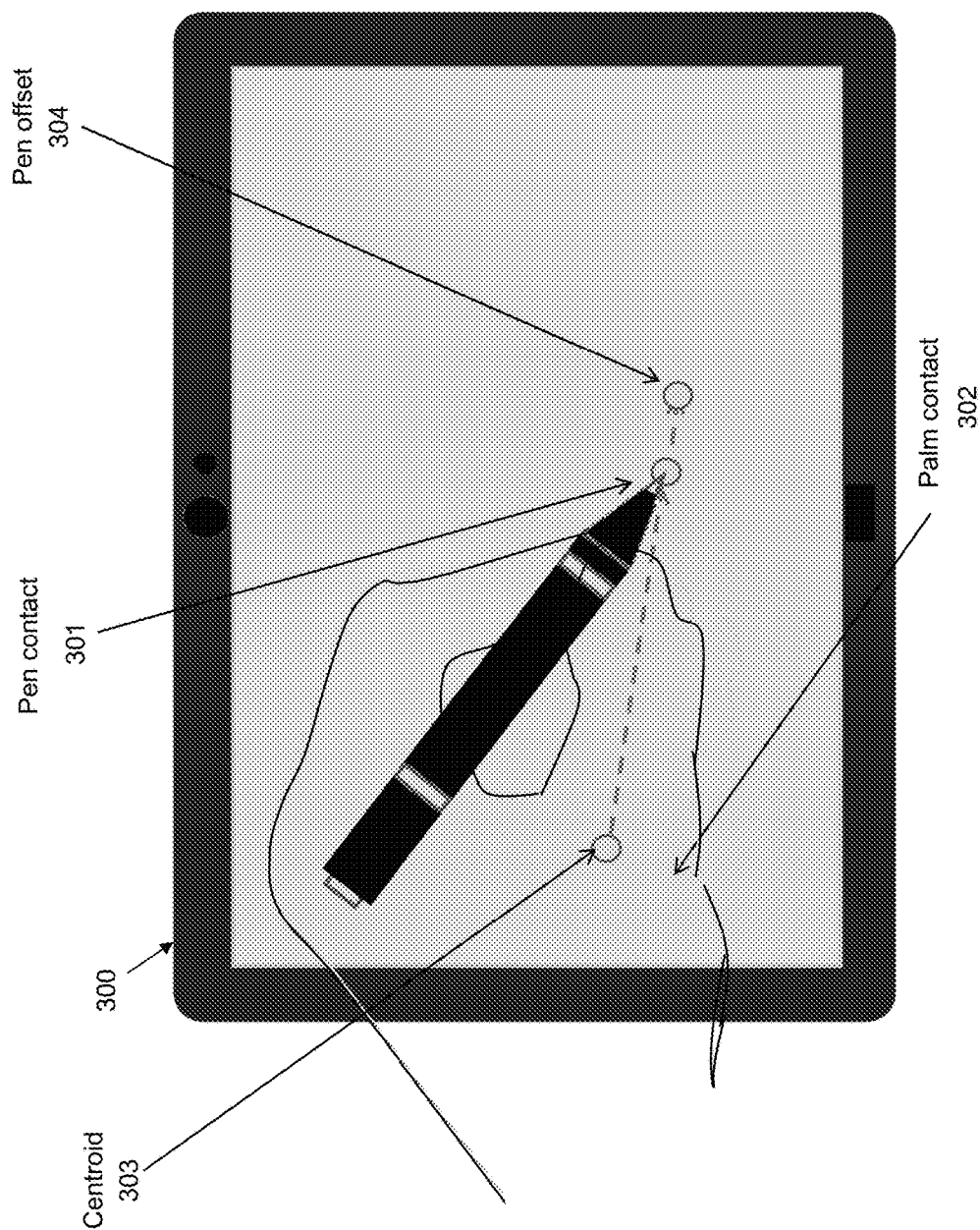
FIG. 3 illustrates an example of pen offset modification.

Illustrated in FIG. 3 is a device 300, e.g., a tablet device having a touch screen that accepts pen inputs from a user. The device 300, e.g., a multi-touch subsystem thereof, has a capability of recognizing and distinguishing between a pen contact 301 and a palm contact 302. The palm contact 302 may be detected but simply ignored with respect to providing input to the device 300.

In an embodiment, the palm contact 302 may be used to facilitate choosing an appropriate pen offset 304. In the example illustrated, a centroid of the palm contact 303 may be determined (estimated) such that, e.g., using straight line approximation, a pen offset that is distal to the user's pen holding orientation is chosen. As may be appreciated, by using the palm contact 302 (and/or centroid 303 thereof) as a point of reference, it may be assured that the pen offset 304 chosen is oriented away from the user's hand. Thus, the pen offset (position of display output) will be visible. The straight line vector calculated for the pen offset 304 illustrated is a non-limiting example, and others may be calculated. For example, a curved line approximation for the pen offset 304 may also be implemented.

If the palm contact 302 is not detected or otherwise it is not desirable to use (e.g., an estimate of the centroid 303 location is difficult or costly to calculate), other inputs may be used. As an example, and referring to FIG. 4, an embodiment may use inputs of other sensors (e.g., geomagnetic sensor inputs, 9-axis sensor inputs, etc.) in order to infer or map a pen offset.

Figure 4:
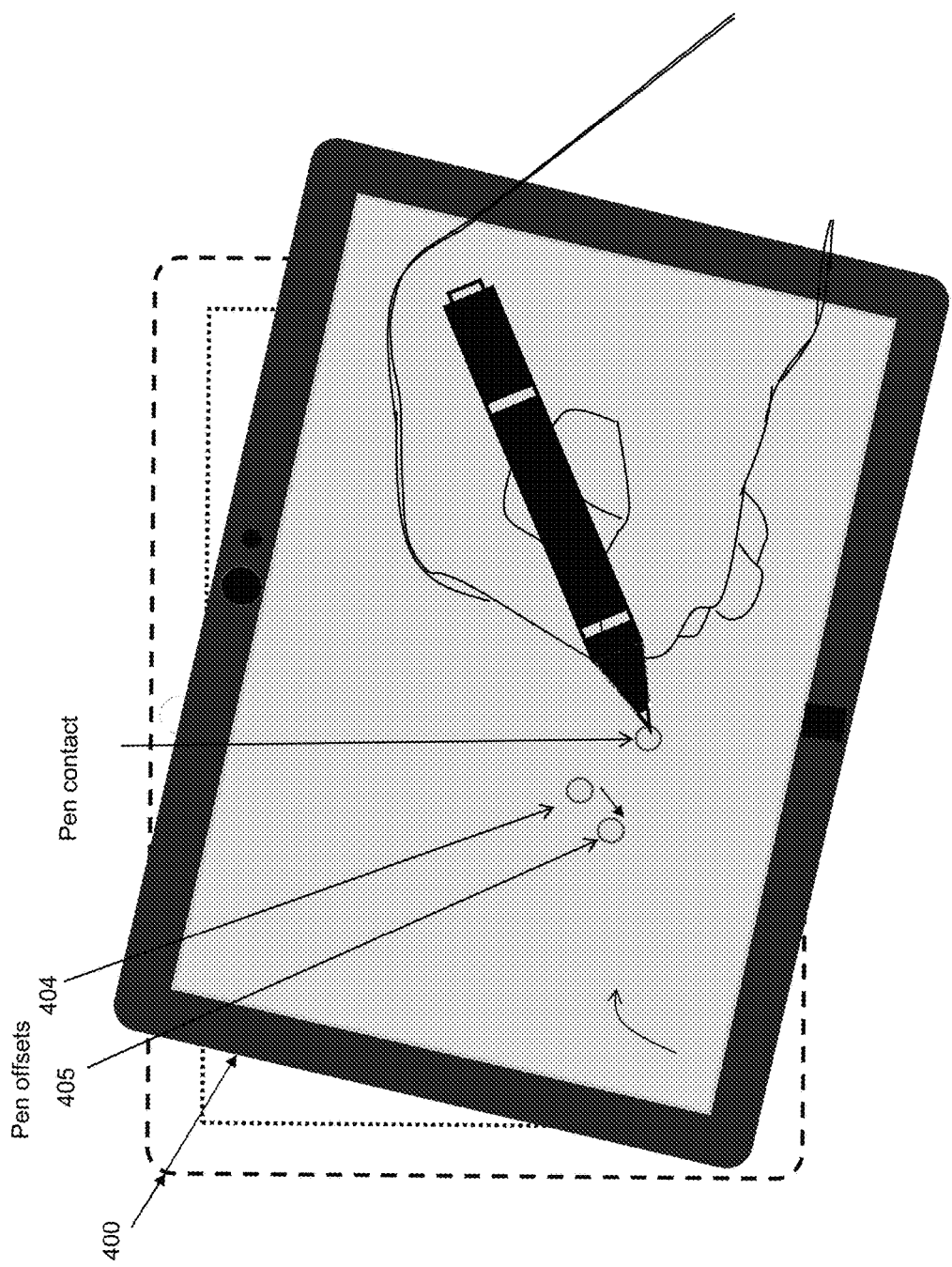
FIG. 4 illustrates another example of pen offset modification.

Thus, in the example illustrated in FIG. 4, a user has reoriented the device 400 by rotating it, as indicated by the curved arrow. In conventional systems, this rotation of the device 400 would not be used to adjust the pen offset 404. However, according to an embodiment, the device rotation, as sensed by one or more sensors, may be used to calculate a new offset 405 that is more appropriate for the user in the given context, i.e., rotated device. Other reorientation information (e.g., tilt) may be used in a similar manner. Thus, an embodiment may dynamically adjust the pen offset from 404 to 405 to accommodate such changed circumstances such that the pen offset for providing display output remains consistent with respect to the user of the device.

In another example, an embodiment may use other sensor inputs such as those provided via the pen itself. For example, a pen may communicate orientation information to the device 400, e.g., via short range wireless communication, such that the device is aware of the relative angle at which the pen is oriented. This information may likewise be used to choose an appropriate location for the pen offset. An embodiment may use combinations of pen contact and other inputs (e.g., sensor inputs, pen inputs, palm contact, etc.) to refine the choice of pen offset.

Figure 5:
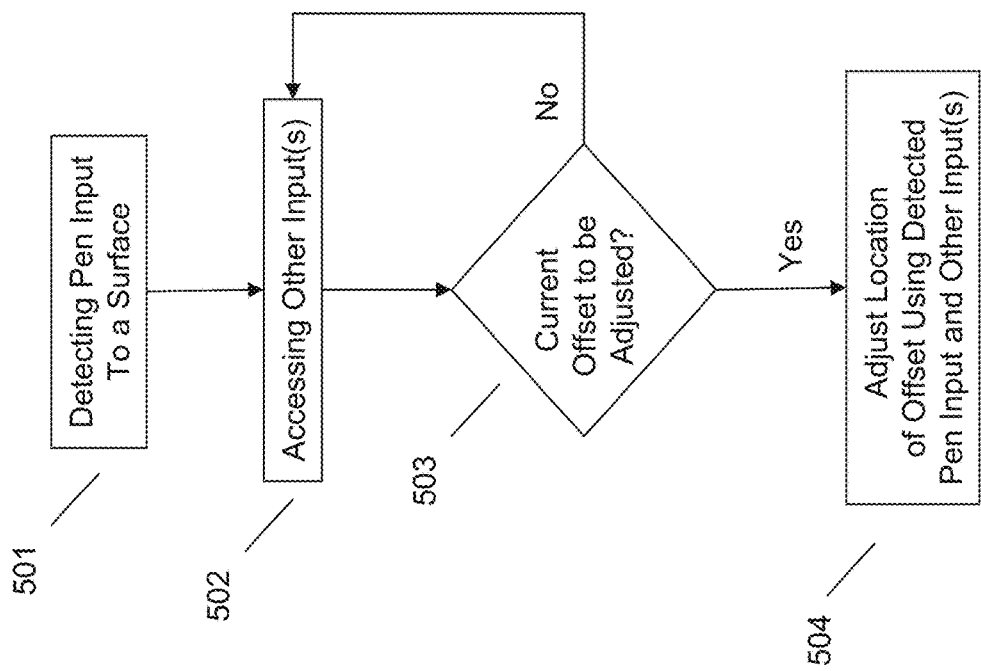
FIG. 5 illustrates an example method of pen offset modification.

In FIG. 5 an example method of adjusting a pen offset for display output is illustrated. In the example illustrated, an embodiment detects pen input to a surface of an electronic device at 501, e.g., detecting a pen contact point or points with a touch screen display of a tablet device. An embodiment may, at 502, also access one or more other inputs associated in time with the pen input detected at 501. For example, an embodiment may access palm contact data and/or data derived from an orientation sensor to determine if the device has undergone an orientation change such as rotation since a previously relevant time. Given the detection of pen input at 501 and the access to other input data at 502, an embodiment may determine at 503 whether the current pen offset is in need of adjustment, e.g., due to an orientation change, due to a change in palm contact location, etc.

If not, an embodiment may maintain the current pen offset until additional data indicating a change is necessary or desirable is obtained. For example, an embodiment may maintain a current pen offset positioning (which again may be a positioning relative to the current pen input point(s)) until a predetermined error is detected.

If such a condition is determined, e.g., that the pen offset currently controlling the output display is off from a calculated optimal position by a certain predetermined amount, an embodiment may thus adjust a location of a display output representing the pen input, i.e., the pen offset, at 504 using both of the detected pen input and the one or more other inputs. This permits a dynamic adjustment of the pen offset such that it is maintained in a relatively stable position with respect to the user.

For example, an embodiment may use the palm contact, the device sensor data, etc., to adjust the pen offset by changing a location for the display output to be further distal to the user with respect to the detected pen input in a given use context, e.g., as illustrated in FIG. 3 and FIG. 4. In the case of a palm contact 302 and/or centroid 303, an embodiment may adjust the pen offset by calculating a distal point with respect to the user using straight line approximation, as illustrated in FIG. 3. Likewise, the pen offset may be adjusted by an embodiment to a distal point with respect to the user a predetermined amount, e.g., as mapped to a particular device orientation, handedness of the user, or like data that permits a better approximation of an appropriate pen offset. In most cases, it is likely that the pen offset should be a predetermined amount from the actual contact point of the pen input, such as between about 0.1 mm and about 3 mm. However, this distance may be adjusted, again using other input(s), including user feedback.

By dynamically inferring the use context, an embodiment thus permits a more appropriate updating or maintenance of the pen offset. This permits a user to focus not on the way in which the device is used during pen input, e.g., with respect to orientation, handedness settings and the like, and frees the user to concentrate on providing substantive inputs to the device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication or short range wireless communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, using a processor, pen input to a surface of an electronic device, wherein the electronic device provides an associated location of a display output representing pen input;
    accessing, using a processor, one or more other inputs associated in time with the pen input, wherein the one or more other inputs identify an orientation of a pen used to provide the pen input with respect to the surface of the electronic device based upon a tilt orientation of the electronic device with respect to a user, an orientation of the electronic device in an environment, and a centroid of a part of a hand of the user to a contact point of the pen based on handedness of the user, and wherein the one or more other inputs select a new location of a display output different from the associated location of a display output; and
    dynamically adjusting, using a processor, the location of a display output representing the pen input as pen inputs are detected, wherein the adjusted location corresponds to the new location of a display output and an offset calculated based upon the one or more other inputs.

2. The method of claim 1, wherein the part of hand of the user comprises palm input at the surface.

3. The method of claim 1, wherein the orientation of the electronic device is based upon data derived from one or more sensors.

4. The method of claim 1, wherein the adjusting comprises changing a location for the display output to be further distal to the user with respect to the detected pen input.

5. The method of claim 4, wherein the adjusting includes calculating a distal point with respect to the user using straight line approximation.

6. The method of claim 5, wherein the calculating includes determining a centroid of palm input, and further wherein the straight line approximation takes into account the centroid of palm input and a point of contact associated with the pen input to the surface.

7. The method of claim 1, wherein the one or more other inputs comprise pen orientation data derived from the pen.

8. The method of claim 5, wherein the distal point with respect to the user is offset from a point of contact associated with the pen input to the surface by a predetermined amount.

9. The method of claim 8, wherein the predetermined amount is between about 0.1 mm and about 3 mm.

10. A device, comprising:
    a surface accepting pen input;
    a display;
    a processor operatively coupled to the surface and the display; and
    a memory storing instructions that are executable by the processor to:
    detect pen input to the surface, wherein the display provides an associated location of a display output representing pen input;
    access one or more other inputs associated in time with the pen input, wherein the one or more other inputs identify an orientation of a pen used to provide the pen input with respect to the surface based upon a tilt orientation of the electronic device with respect to a user, an orientation of the electronic device in an environment, and a centroid of a part of a hand of the user to a contact point of the pen based on handedness of the user, and wherein the one or more other inputs select a new location of a display output different from the associated location of a display output; and dynamically adjust the location of a display output representing the pen input as pen inputs are detected, wherein the adjusted location corresponds to the new location of a display output and an offset calculated based upon the one or more other inputs.

11. The device of claim 10, wherein the part of hand of the user comprise palm input at the surface.

12. The device of claim 10, further comprising one or more sensors;
wherein the orientation of the electronic device is derived from the one or more sensors.

13. The device of claim 10, wherein to adjust comprises changing a location for the display output to be further distal to the user with respect to the detected pen input.

14. The device of claim 13, wherein to adjust includes calculating a distal point with respect to the user using straight line approximation.

15. The device of claim 14, wherein the calculating includes determining a centroid of palm input, and further wherein the straight line approximation takes into account the centroid of palm input and a point of contact associated with the pen input to the surface.

16. The device of claim 10, wherein the one or more other inputs comprise pen orientation data derived from the pen.

17. The device of claim 14, wherein the distal point with respect to the user is offset from a point of contact associated with the pen input to the surface by a predetermined amount.

18. The device of claim 17, wherein the predetermined amount is between about 0.1 mm and about 3 mm.

19. The device of claim 10, wherein the display and the surface are provided in the form of a touch screen unit.

20. A computer program product, comprising:
a computer readable storage device storing code that is executable by a processor of an electronic device, the code comprising:
code that detects pen input to a surface of an electronic device, wherein the electronic device provides an associated location of a display output representing pen input;
code that accesses one or more other inputs associated in time with the pen input, wherein the one or more other inputs identify an orientation of a pen used to provide the pen input with respect to the surface of the electronic device based upon a tilt orientation of the electronic device with respect to a user, an orientation of the electronic device in an environment, and a centroid of a part of a hand of the user to a contact point of the pen based on handedness of the user, and wherein the one or more other inputs select a new location of a display output different from the associated location of a display output; and
code that dynamically adjusts the location of a display output representing the pen input as pen inputs are detected, wherein the adjusted location corresponds to the new location of a display output and an offset calculated based upon the one or more other inputs.

* * * * *